United States Patent
Burnett et al.

[11] Patent Number: 5,870,080
[45] Date of Patent: Feb. 9, 1999

[54] ELECTRO-MAGNETIC TRANSCEIVER COMBINED WITH A POINTING DEVICE

[75] Inventors: Robert J. Burnett, Dakota Dunes, S. Dak.; Ajay Gupta, Sioux City, Iowa

[73] Assignee: Gateway 2000, Inc., North Sioux City, S. Dak.

[21] Appl. No.: 615,421

[22] Filed: Mar. 14, 1996

[51] Int. Cl.$^6$ .................................................. G09G 5/08
[52] U.S. Cl. .......................... 345/163; 345/158; 395/893
[58] Field of Search ...................... 345/156, 157, 345/158, 161, 163–167, 168, 179; 341/20; 359/142, 143, 145, 148, 154, 172; 375/222; 395/882, 884, 885, 892, 893, 309

[56] References Cited

U.S. PATENT DOCUMENTS

| | | | |
|---|---|---|---|
| 4,750,113 | 6/1988 | Buggert | 395/884 |
| 4,754,268 | 6/1988 | Mori | 345/163 |
| 4,924,216 | 5/1990 | Leung | 345/158 |
| 5,075,792 | 12/1991 | Brown et al. | 359/152 |
| 5,081,711 | 1/1992 | Rickman, Jr. | 359/146 |
| 5,262,777 | 11/1993 | Low et al. | 341/20 |
| 5,339,095 | 8/1994 | Redford | 345/158 |
| 5,394,168 | 2/1995 | Smith, III et al. | 345/158 |
| 5,400,246 | 3/1995 | Wilson et al. | 345/168 |
| 5,557,634 | 9/1996 | Balasubramanian et al. | 375/222 |
| 5,564,020 | 10/1996 | Rossi | 395/885 |
| 5,615,083 | 3/1997 | Burnett | 345/161 |
| 5,617,236 | 4/1997 | Wang et al. | 359/172 |
| 5,706,031 | 1/1998 | Brendzel et al. | 345/172 |

*Primary Examiner*—Steven J. Saras
*Assistant Examiner*—David Lewis
*Attorney, Agent, or Firm*—Schwegman, Lundberg, Woessner & Kluth, P.A.; Anthony Claiborne

[57] ABSTRACT

A computer peripheral combines an electro-magnetic transceiver and a computer pointing device in the same housing, The pointing device cable provides the electrical connection between the electro-magnetic transceiver and the computer's data bus. The transceiver receives information in the form of electro-magnetic pulses from an appropriately-equipped remote device, converts the pulses to electrical signals, and relays the electrical signals to the computer. The transceiver receives electrical signals addressed to the device from the computer, converts the electrical signals to electro-magnetic pulses, and relays the pulses to the remote device.

8 Claims, 2 Drawing Sheets

5,870,080

ELECTRO-MAGNETIC TRANSCEIVER COMBINED WITH A POINTING DEVICE

FIELD OF THE INVENTION

The present invention is related to computer systems and in particular to a computer peripheral combining an electro-magnetic transceiver and a computer pointing device in the same housing for attachment to a computer through an I/O channel.

BACKGROUND OF THE INVENTION

As the number of peripherals users attach to their computer systems proliferate, the more dense the tangle of cables around the computer becomes.

Besides being bulky, cables also limit the maximum distance the peripherals may be located from the computer. Peripheral manufacturers have addressed these problems by communicating commands and data through electro-magnetic (EM) pulses which do not require any type of physical connection between the peripheral and the computer. Electro-magnetic communication requires two electronic circuits. The first, called an EM transmitter, converts electrical signals into EM pulses and broadcasts the EM pulses into the atmosphere. A corresponding electronic circuit, called an EM receiver, collects the pulses and converts them back into electrical signals. In theory, EM communication could use infrared (IR) light, radio frequency (RF) waves, or any other portion of the electro-magnetic spectrum. As a practical matter, however, only IR and RF are suitable for computer communication without causing or being impeded by interference from other radiation sources. Most manufacturers have chosen to implement EM technology using IR but the following discussion applies to RF as well.

The most basic IR connection is used in one-way communication: the computer sends commands and data to the peripheral but the peripheral does not send information back to the computer. A one-way IR communication link has an IR transmitter coupled to the data bus of the computer and an IR receiver coupled to the input line of the peripheral device. The IR transmitter converts the standard electrical signals representing commands and data for the device into pulses of infrared light and transmits those pulses across some distance to the IR receiver. The IR receiver then converts the pulses back into standard electrical signals and passes them onto the device where they are acted upon as either commands or data.

A more complicated IR connection provides for bi-directional communication between the computer and the peripheral, so the computer and the device must each have both an IR transmitter and an IR receiver. In such cases, the IR transmitter and IR receiver circuitry is usually combined into a single unit called an IR transceiver.

Until recently, all IR-equipped peripherals used proprietary technology so each device required its own unique IR transceiver connected to the computer. In 1994, however, an industry organization called the Infrared Data Association (IRDA) proposed an IR standard that promotes compatibility among IRDA compliant devices. Such compatibility allows a computer with a single IRDA transceiver to communicate with multiple IRDA devices such as printers, modems, fax machines, and even other IRDA-equipped computers. The IRDA standard also specifies error checking and correction protocols and enables a 9600 KB to 4 MB per second transfer rate.

If using proprietary IR circuitry, a peripheral manufacturer provides an external unit containing the corresponding proprietary IR circuit for the computer. This external unit, often referred to as a "dongle", interfaces to the computer by means of a cable connected through a serial, or other suitable, port. Since the IRDA standard was promulgated, many vendors have announced they will build IRDA compliant computers but existing computer users want the advantages offered by IRDA. Therefore, a dongle incorporating the IRDA specification will be an important add-on device for many computers.

By using IRDA compliant peripherals and an IRDA dongle, users can reduce the number of peripheral cables they have connected to their computer. However, the IRDA dongle does not completely eliminate all peripheral cables since it itself requires a cable connected to a serial port. Also, most users have a pointing device connected by another cable to the computer, usually to a serial port, and a keyboard connected by yet another cable. The need to connect the IRDA dongle and the pointing device through separate serial ports impairs the user's ability to attach other serial devices as most computers are configured with only two serial ports. A further limitation of the IRDA dongle is that it competes with the pointing device for space in the user's often crowded work area. Thus, there is a need to reduce the space required for such dongles.

SUMMARY OF THE INVENTION

The present invention captures the advantages of an electro-magnetic (EM) dongle, eliminates the dongle cable, and requires no additional space on the user's desk by combining an EM transceiver with control circuitry for a pointing device in a standard mouse, trackball, or similar housing. The standard pointing device cable provides the electrical connection between the transceiver and a computer's data bus.

In one embodiment of the pointing device, the housing for the pointing device contains an EM transceiver and the pointing device control circuit. The EM transceiver and the pointing device control circuit are separately coupled to the data bus of a standard desktop computer. Two different pairs of wires run through the pointing device cable and terminate in two separate serial I/O port plugs (such as those used for RS232 communication), one for the electrical signals from the transceiver and one for the signals from the pointing device. Each I/O port plug connects to a serial port on the computer. In an alternate embodiment, the pointing device wire pair terminates in a PS2 mouse port plug for a computer having a PS2 mouse port.

The transceiver has a sensor/emitter portion that captures EM pulses sent from a compatible or corresponding transceiver in a peripheral device which the transceiver converts into electrical signals. The transceiver then sends the electrical signals via the transceiver wire in the cable to the serial I/O port. The computer's data bus in turn retrieves the signals from the I/O port and relays them to the computer's main processor. When the computer's main processor has commands or data to send to the peripheral, the process is reversed. The transceiver receives the appropriate electrical signals through its wires in the cable, converts the signals to EM pulses, and relays the pulses to the device via the sensor/emitter.

The configuration of other embodiments depend on the type of EM pulses used. In one alternate embodiment, the EM pulses are infrared (IR) light and the sensor/emitter is positioned on the outside of the pointing device housing to collect and broadcast the IR pulses. A further embodiment using IR pulses comprises a transceiver compatible with the Infrared Data Association standard to allow a single transceiver to communication with multiple IRDA compatible devices. In another alternate embodiment, the EM pulses are RF waves and the sensor/emitter is a small antenna positioned on the outside of the housing. In a further alternate embodiment using RF pulses, the antenna is placed inside the housing. And in a still further embodiment using RF pulses, the antenna is incorporated into the cable by having the cable itself serve at the antenna or through an antenna lead woven into the cable sheathing.

In another group of embodiments, the connection between the EM transceiver and the computer differs. In one alternate embodiment, the pointing device is configured to connect to a computer equipped with an intelligent serial I/O bus designed to the Universal Serial Bus (USB) specifications. The pointing device and the transceiver are USB compatible circuits having the ability to identify themselves to the USB compatible bus and are coupled to it through a USB port (called a "hub"). The USB compatible bus translates the device identification into a code the computer's processor recognizes as a device address. Because of the intelligence embedded in each device and in the USB compatible bus, a single I/O channel from the pointing device to the USB hub services both the pointing device and transceiver circuits. Furthermore, using USB compatible devices allows the invention to take advantage of the 4 MB transfer rates provided under the USB specification thus speeding the data flow to and from the computer.

In still another embodiment, the electrical signals from the pointing device and the transceiver are fed into a multiplexer/demultiplexer circuit (MUX/DMUX) located in the pointing device. The multiplexer portion of the MUX/DMUX interleaves the two signals together into a composite electrical signal and sends the composite signal via a single pair of wires to a serial I/O port on the computer. A corresponding MUX/DMUX is coupled between the serial I/O port and the data bus in the computer. The demultiplexer portion of the MUX/DMUX in the computer unpacks the composite electrical signal into the original signal sent by the transceiver and the original signal sent by the pointing device, and routes the two signals to the data bus. The process is reversed to send commands or data from the computer to the peripheral by using the multiplexer portion of the MUX/DMUX in the computer and the demultiplexer in the MUX/DMUX in the pointing device.

As has been discussed above, three drawbacks of a standard EM dongle is that it requires a cable connection to the computer, competes with the user's pointing device for space on the desk, and takes up a serial port. The present invention addresses those drawbacks by combining the EM circuitry for the dongle in the same housing as the pointing device thus returning the lost space to the user and also eliminating one of the tangle of cables around the computer. In addition, the mouse and the EM dongle can share a single serial port to provide the user with flexibility in attaching additional serial devices to the computer.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The same components may appear in multiple Figures with the same number.

Figure 1:
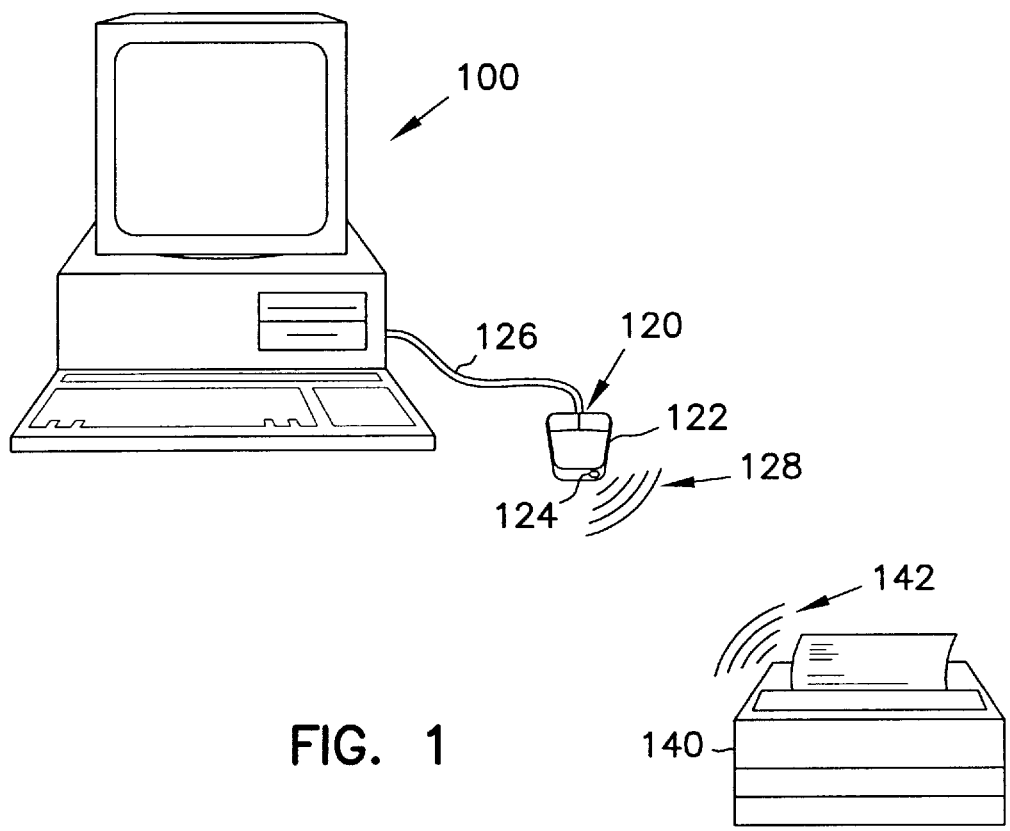
FIG. 1 is a perspective view of the present invention illustrating electro-magnetic communication between an electro-magnetic (EM) transceiver in a pointing device and an EM-enabled printer.

FIG. 1 shows a perspective view of a desktop computer 100 with a mouse 120 and a printer 140. Computer 100 also includes a keyboard, a monitor, memory and a processor. All these components are common in the industry and so will not be described in detail. The mouse 120 has a housing 122 and a cable 126 connecting it to the computer 100. A standard electro-magnetic (EM) transceiver circuit is located inside the mouse 120 and has a sensor/emitter portion 124 external to the housing. The computer 100 sends electrical signals representing commands and data for the printer via the cable 126 to the transceiver. The transceiver converts the electrical signals into EM pulses 128 and broadcasts the pulses 128 to the printer 140 by means of the sensor/emitter 124. The printer 140 is equipped with a corresponding EM transceiver with a sensor/emitter which converts the EM pulses 128 into printer command and data signals. Transceiver circuits using sensors and emitters, such as model numbers BPV22BF (sensor) and TS1P5201 (emitter) from Telefunken of Germany, are standard off-the-shelf components in the industry and are not discussed further.

When the printer 140 has information, such as "load paper", to send to the computer 100, the EM transceiver in the printer 140 converts the information into EM pulses 142 and broadcasts them. The EM transceiver in the mouse collects the EM pulses 142, converts them into electrical signals and sends them via the cable 126 to the computer 100.

As will be readily apparent to those skilled in the art, the electro-magnetic (EM) communication link between the computer and peripheral can be implemented in many different ways. A bi-directional link is shown in FIG. 1 but a uni-directional link, where only the computer sends commands and data to the peripheral, is a further embodiment of the present invention. A mouse is shown in FIG. 1 as the pointing device but track balls, digitizers, joysticks, light pens, or other similar devices are alternate embodiments. While FIG. 1 illustrates the invention using a printer, the use of other similarly equipped peripheral devices will be apparent to those skilled in the art. Electro-magnetic communication can use infrared (IR) light, radio frequency (RF) waves, or any other portion of the electro-magnetic spectrum. One embodiment of the present invention uses IR; another embodiment uses RF. Yet another embodiment uses a transceiver manufactured to the IR standard proposed by the Infrared Data Association ("IRDA") allowing more than one IRDA compatible peripheral to be controlled by the same transceiver in the pointing device.

Figure 2:
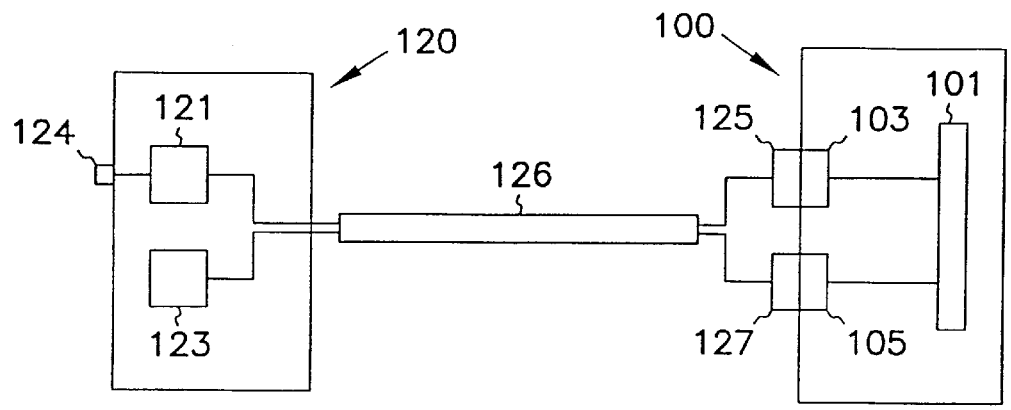
FIG. 2 is a block diagram of the electrical connections in an embodiment of the present invention that uses separate I/O channels for sending electrical signals from the EM transceiver and the pointing device to the computer.
Figure 3:
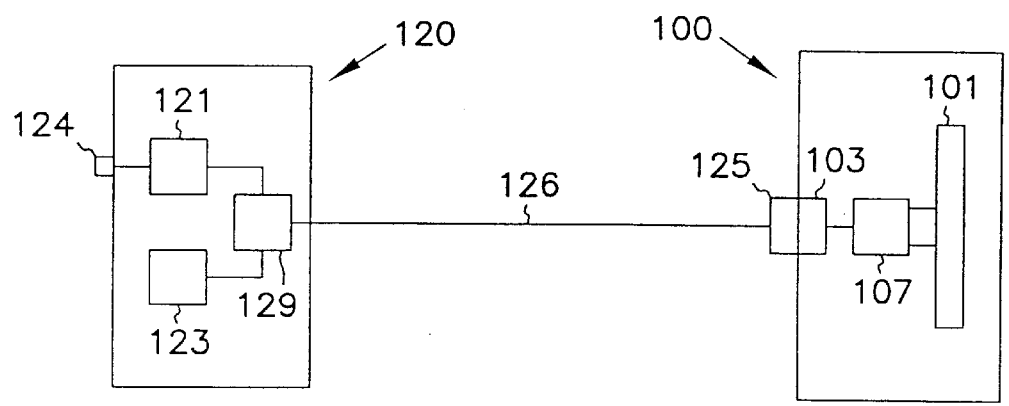
FIG. 3 is a block diagram of the electrical connections in an embodiment of the present invention that multiplexes the EM transceiver electrical signals and the pointing device electrical signals into a single I/O channel.
Figure 4:
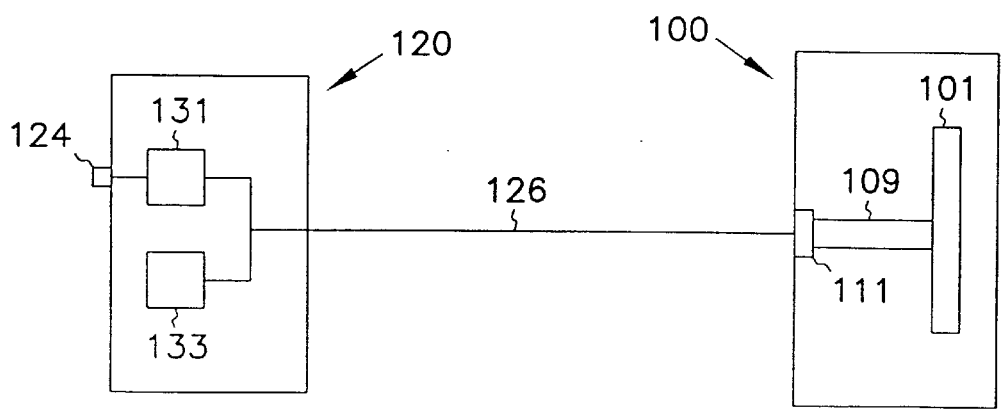
FIG. 4 is a block diagram of the electrical connections in an embodiment of the present invention coupled to a computer having an intelligent serial I/O bus compatible with Universal Serial Bus specifications.

FIGS. 2 through 4 are block diagrams of the electrical connections for different embodiments of the invention. In FIGS. 2 and 3, an industry standard EM transceiver 121 is located in the mouse 120 along with industry standard mouse control circuitry 123. Mouse control circuitry 123 is the standard circuitry configured within an off-the-shelf mouse, such as the Microsoft mouse part number 58269, which determines the position and command state of the mouse. The EM sensor/emitter portion 124 of the transceiver 121 is positioned on the outside of the mouse 120. In FIG. 4, an EM transceiver 131 and mouse control circuitry 133 compatible with Universal Serial Bus protocols (as described below) replace EM transceiver 121 and mouse control circuitry 123, respectively. It will be apparent to a person skilled in the art that alternate embodiments of FIGS. 2 through 4 are possible by changing the type of EM pulse.

In the embodiment shown in FIG. 2, two pairs of wires, one pair coupled to the transceiver 121 and one pair to the mouse circuit 123, are bound into a single cable 126 which branches into a Y junction at the opposite end. The wire pair from the transceiver 121 is terminated by an I/O port plug 125 on one branch of the Y and the wire pair from the mouse circuit 123 is terminated by an I/O port plug 127 on the other branch. I/O port plugs 125 and 127 connect respectively to I/O ports 103 and 105 in the computer 100. I/O ports 103 and 105 are two of a plurality of I/O ports coupled to the computer's data bus 101. In one embodiment, plug 125 is a serial port plug and port 103 is a serial port, while plug 127 is a PS2 mouse port plug and port 105 is a PS2 mouse port. In another embodiment, plugs 125 and 127 are both serial port plugs and port 103 and 105 are both serial ports.

An alternate embodiment in which the electrical signals from the transceiver 121 and from the mouse circuitry 123 are fed into a serial multiplexer/demultiplexer circuit 129 (MUX/DMUX) is shown in FIG. 3. The multiplexer portion of MUX/DMUX 129 interleaves the two electrical signals together into a composite electrical signal and sends the composite electrical signal via a single pair of wires in the mouse cable 126 to serial plug 125 connected to serial port 103 in the computer 100. A corresponding MUX/DMUX 107, coupled between the serial port 103 and the data bus 101 the computer 100, unpacks the composite electrical signal into the original electrical signal sent by the transceiver 121 and the original electrical signal sent by the mouse circuitry 123 and feeds the unpacked signals to the data bus 101. The process is reversed to send commands or data from the computer 100 to the printer 140 by using the multiplexer portion of MUX/DMUX 107 and the demultiplexer in the MUX/DMUX 129. The signals may be multiplexed using frequency division multiplexing, time division multiplexing, statistical multiplexing, or a combination of methods incorporating industry standard multiplexing protocols supported by commonly available multiplexer/demultiplexer circuits. Other methods of multiplexing the signals will be apparent to those skilled in the art upon reading the above description.

FIG. 4 shows a computer 100 equipped with an intelligent serial I/O bus 109 compatible with the Universal Serial Bus (USB) specification currently being reviewed for implementation by several industry vendors. The USB specification is an adaption of existing two-line serial connections and defines a universal connector and a single protocol for all USB compatible devices. The pointing device 133 and the transceiver 131 circuits are USB compatible and capable of identifying themselves to the USB compatible bus. Because of this device identification protocol, the signals from both the pointing device 123 and the transceiver 121 can be sent via a single pair of wires in a USB compatible cable 126 to USB port 111. The device identification logic embedded in the USB compatible bus 109, which is coupled to the USB port 111, determines which device sent the signal and translates the device identification into a device address recognizable to the computer's processor. USB compatible device Manufacturers such as Microsoft and Logitech have announced plans to make devices compatible with the USB specification.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A peripheral device for a computer comprising:

a pointing device having a housing and circuitry within the housing to determine the position and command state of the pointing device, wherein the pointing device circuitry is electrically coupled to the computer for transmitting the position and command state of the pointing device to a processor in the computer and further coupled to a first I/O port plug by means of a first plurality of wires, and the first I/O plug is coupled to a first I/O port on the computer; and an electro-magnetic transceiver positioned within the housing for converting electro-magnetic pulses to and from electrical signals representative of commands and data, the transceiver being electrically coupled to the processor for relaying such electrical signals between the transceiver and the processor and further coupled to a second I/O port plug by means of a second plurality of wires, and the second I/O port plug is coupled to a second I/O port on the computer, the transceiver comprising at least one sensor/emitter for sending and receiving electro-magnetic pulses intended for further peripheral devices, wherein the first and second plurality of wires are bound together into a cable having the first and second I/O port plugs separated out of the cable at one end, the electro-magnetic pulses comprise radio frequency waves, and the sensor/emitter comprises an antenna lead incorporated into the cable.

2. A peripheral device for a computer comprising:

a pointing device having a housing and circuitry within the housing to determine the position and command state of the pointing device, wherein the pointing device circuitry is electrically coupled to the computer for transmitting the position and command state of the pointing device to a processor in the computer; and an electro-magnetic transceiver positioned within the housing for converting electro-magnetic pulses to and from electrical signals representative of commands and data, the transceiver being electrically coupled to the processor for relaying such electrical signals between the transceiver and the processor, the transceiver comprising at least one sensor/emitter for sending and receiving electro-magnetic pulses intended for further peripheral devices, wherein the electro-magnetic pulses comprise radio frequency waves and the sensor/emitter comprises an antenna lead incorporated into a cable coupling the pointing device circuitry and the electro-magnetic transceiver to the computer.

3. A computer system comprising:

a computer having a keyboard, monitor, memory, processor, a data bus, and a plurality of I/O ports, wherein each of the plurality of I/O ports is coupled to the data bus;

a pointing device having a housing and circuitry within the housing to determine the position and command state of the pointing device, wherein the pointing device circuitry is electrically coupled to the data bus of the computer for transmitting the position and command state of the pointing device to the processor and further coupled to a first I/O plug by means of a first plurality of wires, and the first I/O plug is coupled to a first one of the plurality of I/O ports; and an electro-magnetic transceiver positioned within the housing for converting electro-magnetic pulses to and from electrical signals representative of commands and data, and electrically coupled to the data bus for relaying the electrical signals between the transceiver and the processor, the transceiver being coupled to a second I/O port plug by means of a second plurality of wires, and the second I/O port plug being coupled to a second one of the plurality of I/O ports, the transceiver comprising a sensor/emitter for sending and receiving electro-magnetic pulses between the transceiver and devices having corresponding sensor/emitters, wherein the first and second plurality of wires are bound together into a cable having the first and second I/O port plugs separated out of the cable at one end, the electro-magnetic pulses comprise radio frequency waves, and the sensor/emitter comprises an antenna lead incorporated into the cable.

4. A computer system comprising:

a computer having a keyboard, monitor, memory, processor, and a data bus;

a pointing device having a housing and circuitry within the housing to determine the position and command state of the pointing device, wherein the pointing device circuitry is electrically coupled to the data bus of the computer for transmitting the position and command state of the pointing device to the processor; and an electro-magnetic transceiver positioned within the housing for converting electro-magnetic pulses to and from electrical signals representative of commands and data, and electrically coupled to the data bus for relaying the electrical signals between the transceiver and the processor, the transceiver comprising a sensor/emitter for sending and receiving electro-magnetic pulses between the transceiver and devices having corresponding sensor/emitters, wherein the electro-magnetic pulses comprise radio frequency waves and the sensor/emitter comprises an antenna lead incorporated into a cable coupling the pointing device circuitry and the electro-magnetic transceiver to the computer.

5. A peripheral device for a computer comprising:

a pointing device having a housing and circuitry within the housing to determine the position and command state of the pointing device, the circuitry coupled to a first I/O port plug by means of a first plurality of wires, and the first I/O port plug further coupled to a first I/O port on the computer for transmitting the position and command state of the pointing device to a processor in the computer; and an electro-magnetic transceiver positioned within the housing for converting radio frequency waves to and from electrical signals, the transceiver coupled to a second I/O port plug by means of a second plurality of wires, and the second I/O port plug further coupled to a second I/O port on the computer for relaying such electrical signals between the transceiver and the processor, wherein the first and second plurality of wires are bound together into a cable having the first and second I/O port plugs separated out of the cable at one end, and an antenna lead is incorporated into the cable and functions as a sensor/emitter for sending and receiving radio frequency waves intended for further peripheral devices.

6. A peripheral device for a computer comprising:

a pointing device having a housing and circuitry within the housing to determine the position and command state of the pointing device, the circuitry coupled to a cable which is further coupled to an intelligent serial I/O bus in the computer for transmitting the position and command state of the pointing device to a processor in the computer; and an electro-magnetic transceiver positioned within the housing for converting radio frequency waves to and from electrical signals, the transceiver coupled to the cable for relaying such electrical signals between the transceiver and the processor, wherein an antenna is lead incorporated into the cable and functions as a sensor/emitter for sending and receiving radio frequency waves intended for further peripheral devices.

7. A computer system comprising:

a computer having a keyboard, monitor, memory, processor, a data bus, and plurality of I/O ports, wherein the data bus and each of the plurality of I/O ports is coupled to the data bus;

a pointing device having a housing and circuitry within the housing to determine the position and command state of the pointing device, the circuitry coupled to a first I/O port plug by means of a first plurality of wires, and the first I/O port plug further coupled to a first one of the plurality of I/O ports for transmitting the position and command state of the pointing device to the processor; and an electro-magnetic transceiver positioned within the housing for converting radio frequency waves to and from electrical signals, the transceiver coupled to a second I/O port plug by means of a second plurality of wires and the second I/O port plug further coupled to a second one of the plurality of I/O ports for relaying the electrical signals between the transceiver and the processor, wherein the first and second plurality of wires are bound together into a cable having the first and second I/O port plugs separated out of the cable at one end, and an antenna lead is incorporated into the cable and functions as a sensor/emitter for sending and receiving radio frequency waves between the transceiver and devices having corresponding sensor/emitters.

8. A computer system comprising:

a computer having a keyboard, monitor, memory, processor, a data bus, and an intelligent serial I/O bus, wherein the processor and the serial I/O bus are coupled to the data bus;

a pointing device having a housing and circuitry within the housing to determine the position and command state of the pointing device, the pointing device circuitry coupled to a cable which is further coupled to the serial I/O bus for transmitting the position and command state of the pointing device to the processor; and an electro-magnetic transceiver positioned within the housing for converting radio frequency waves to and from electrical signals, the transceiver coupled to the cable for relaying the electrical signals between the transceiver and the processor, wherein an antenna lead is incorporated into the cable and functions as a sensor/emitter for sending and receiving radio frequency waves between the transceiver and devices having corresponding sensor/emitters.

* * * * *